(No Model.)  5 Sheets—Sheet 1.
C. C. BURTON.
TRANSFER TABLE AND DOCK.
No. 363,114. Patented May 17, 1887.
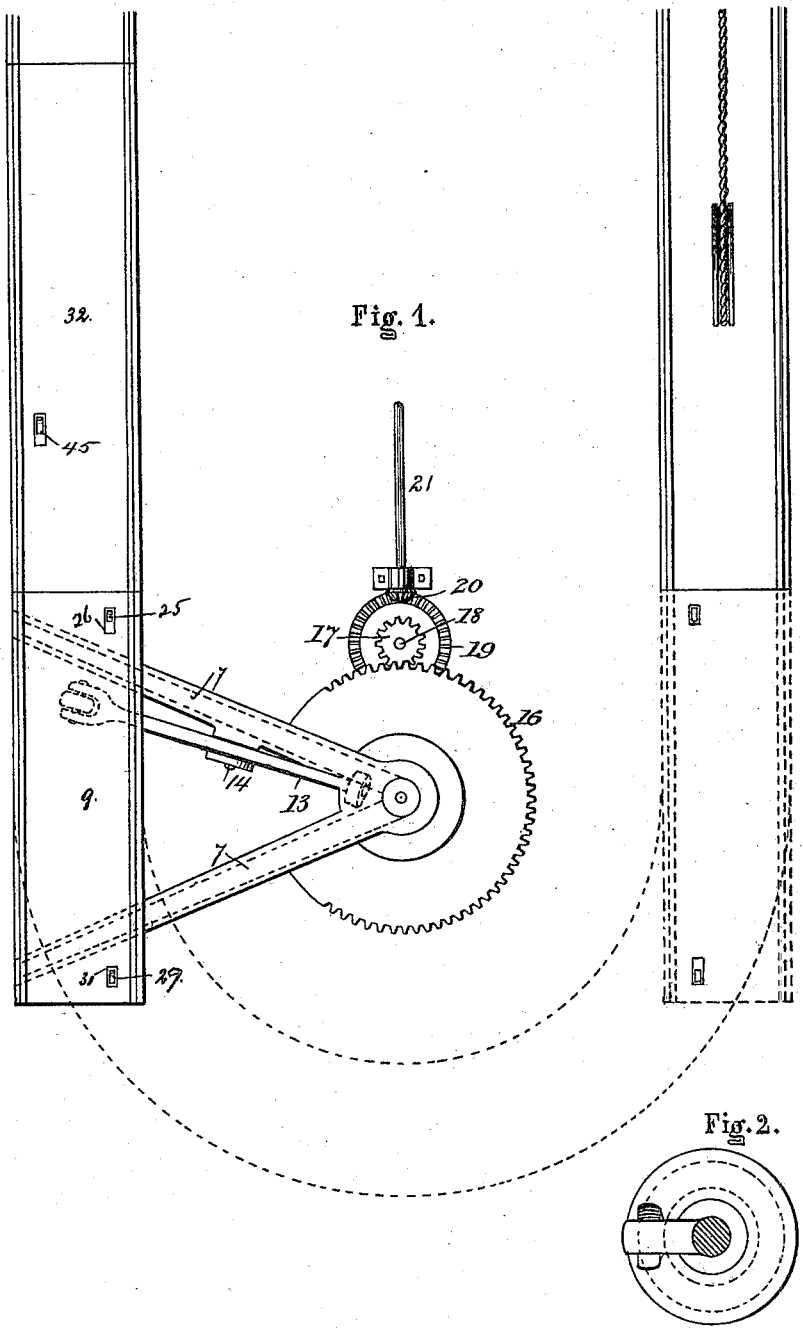
WITNESSES.
Rich. George
Edwin Whisley
INVENTOR.
C. C. Burton
By Risley Quinn & Berry
Attys (No Model.)

C. C. BURTON.
TRANSFER TABLE AND DOCK.

No. 363,114. Patented May 17, 1887.

WITNESSES.

INVENTOR.

(No Model.)

C. C. BURTON.
TRANSFER TABLE AND DOCK.

No. 363,114.  Patented May 17, 1887.

5 Sheets—Sheet 3.

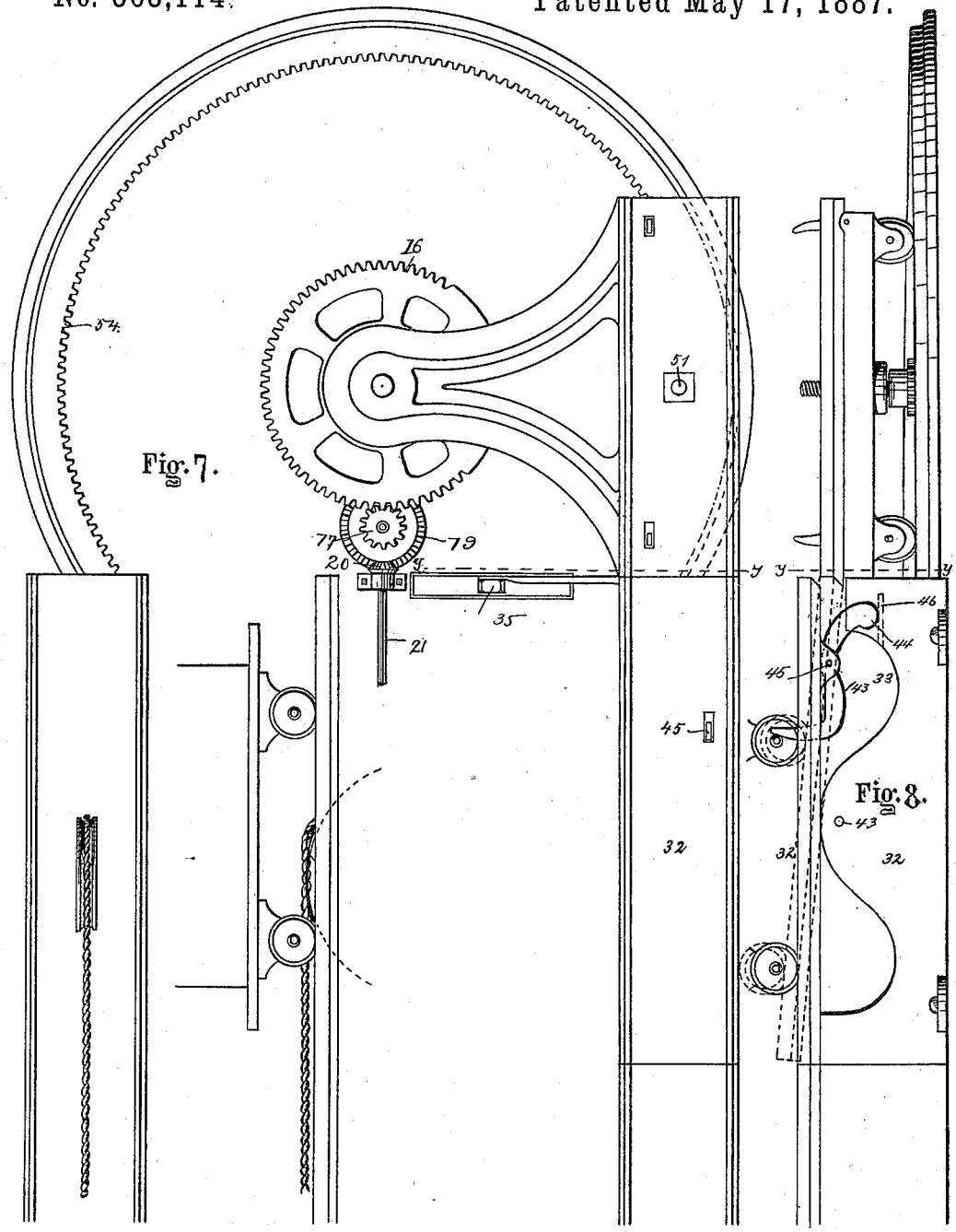

(No Model.)  5 Sheets—Sheet 5.

C. C. BURTON.
TRANSFER TABLE AND DOCK.

No. 363,114.  Patented May 17, 1887.

WITNESSES.
Rich. George.
Edwin H. Risley

INVENTOR.
C. C. Burton
By Risley &c. Perry
Attys

UNITED STATES PATENT OFFICE.

CHARLES C. BURTON, OF UTICA, NEW YORK.

TRANSFER TABLE AND DOCK.

SPECIFICATION forming part of Letters Patent No. 363,114, dated May 17, 1887.

Application filed September 10, 1886. Serial No. 213,267. (No model.)

*To all whom it may concern:*

Be it known that I, CHARLES C. BURTON, of Utica, in the county of Oneida and State of New York, have invented certain new and useful Improvements in Transfer Tables and Docks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a transfer table and dock for shifting and transferring cars and all other rolling-stock used on railways of all description, whereby the rolling-stock may be shifted from one track to another or otherwise transferred, and embraces the mechanism to accomplish this end, hereinafter more fully pointed out and claimed.

Figure 3:
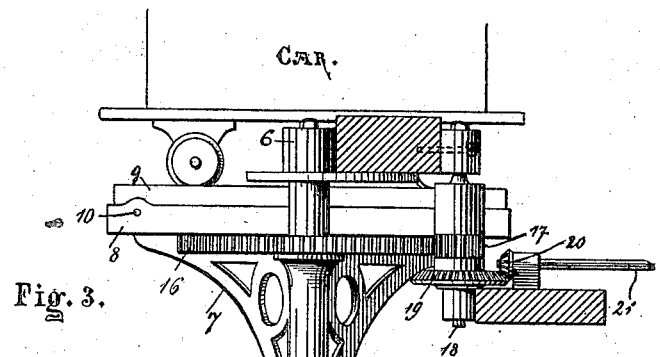
Figure 4:
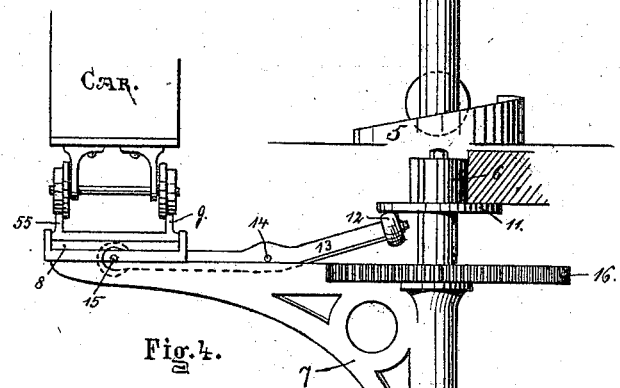
Figure 5:
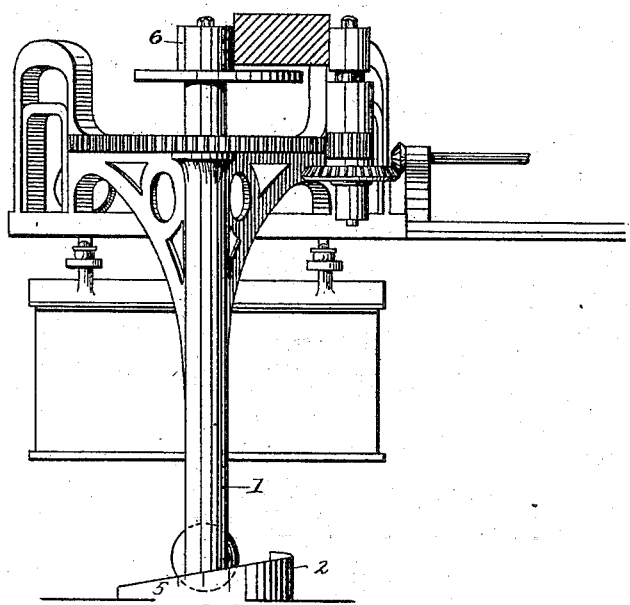
Figure 6:
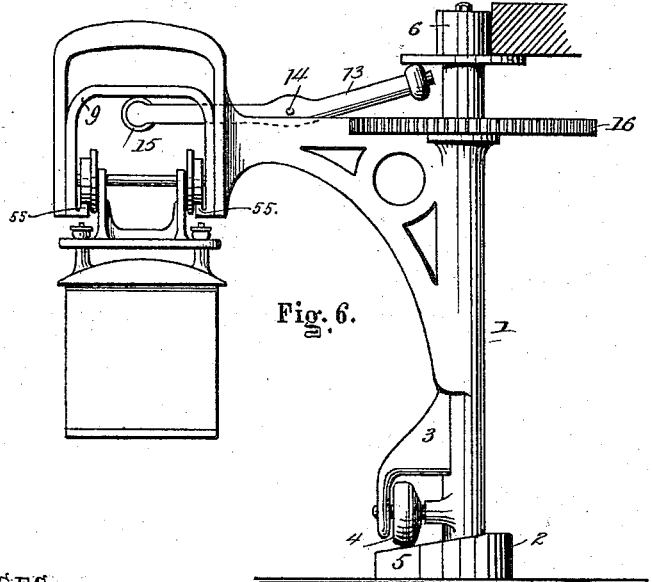

In the accompanying drawings, Figures 1, 2, 3, and 4 represent mechanism constructed and designed for use on elevated railroads. Figs. 5 and 6 represent mechanism constructed and designed to be used upon a suspended or elevated system of railways. Figs. 7, 8, 9, 10, and 11 represent mechanism constructed and designed to be used upon surface railways, whether operated by cable or motive power.

The same mechanical principles are operative in the various mechanism illustrated in the drawings, the various modifications being provided for accomplishing the same purpose in substantially the same way.

Figure 9:
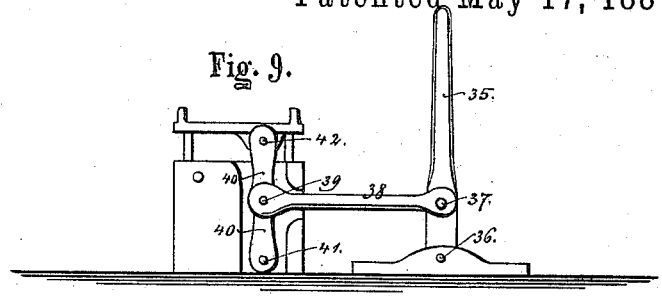
Figure 10:
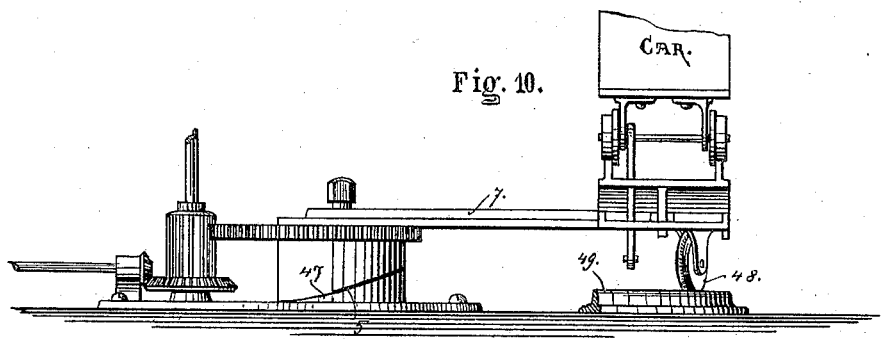
Figure 11:
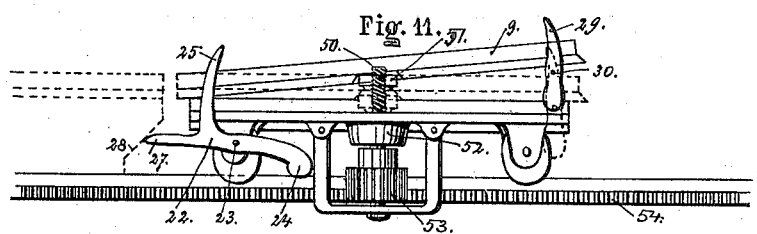

In the drawings, Fig. 1 represents a plan view of my elevated system. Fig. 2 is a cross-section of the shaft and foot-plate on line $x\ x$, Fig. 4. Fig. 3 is a side elevation taken from the right of Fig. 1. Fig. 4 is a side elevation representing the same swung half-way around. Fig. 5 represents a side elevation of the shaft and connecting mechanism designed to be used in connection with a suspended or elevated system of railways, the view being taken from the right of Fig. 6. Fig. 6 represents a side elevation showing the car swung half-way around. Fig. 7 represents a plan view of my improved surface transfer system. Fig. 8 is a side view taken from the right of Fig. 7. Fig. 9 represents a view on line $y\ y$ of Fig. 8 of the drawings. Fig. 10 represents a side elevation of my shifting device, the same being moved half-way around. Fig. 11 represents a central vertical section of the same, showing the car removed.

Having described my invention with reference to the figures illustrated in the accompanying drawings, I will now proceed to describe the same with reference to the figures marked upon the drawings, in which similar numbers refer to corresponding parts throughout the several views.

For shifting rolling-stock on elevated-railway systems I provide central shaft, 1, the lower end of which is journaled or pivoted in a stationary incline track, 2, the shaft being pivoted or journaled in such manner as to be raised or lowered when the same is rotated. On the side of the shaft I provide a bracket or projection, 3, with a recess at its bottom for receiving anti-friction roll 4, journaled between the bracket and the shaft. The anti-friction roll is constructed and mounted to travel on the surface of the incline track 5, Fig. 4, whereby the shaft and connecting mechanism is raised and lowered by the anti-friction wheel traveling on the incline track when the shaft is rotated, as hereinafter pointed out. I provide a stationary journal, in which the upper end of the shaft is free to move horizontally and vertically. 6, Fig. 4, represents the journal at the upper end of the shaft.

For supporting and carrying a table or platform I provide one or more radial swinging arms, 7 7, Figs. 1 and 4, rigidly or permanently attached to shaft 1, and extending outward for receiving table or platform 8, Figs. 3 and 4, which is secured rigidly to the radial arms. On this table I provide a pivoted tilting incline, 9. (Shown in Figs. 1, 3, 4, 11, and other figures.) I preferably pivot the tilting incline to suitable ears in the table or platform at 10, Fig. 3, whereby the incline is free to be moved upward at its opposite end for discharging the car or rolling-stock onto the main track, to which position it is moved by gravity. The tilting incline is operated by the mechanism hereinafter described.

I provide a stationary cam or track, 11, Fig. 4, surrounding the shaft and held stationary in any suitable manner. The face of this track or cam is straight or smooth and is engaged by anti-friction roll 12, Fig. 4, working on the end of lever 13, Fig. 4, pivoted to one of the arms at 14, the opposite end carrying anti-friction roll 15, Fig. 4, which engages the under surface of the pivoted tilting device 9 at some point to the right of pivotal point 10, Fig. 3.

For swinging the shaft and the connecting mechanism I provide gear-wheel 16, Figs. 3 and 4, rigidly held or keyed to the shaft, which engages pinion-gear 17, Fig. 3, mounted on shaft 18, suitably journaled, which shaft carries beveled gear 19, which is driven by a bevel spur-gear, 20, rigidly held on driving-shaft 21, Fig. 3.

When power is applied to the driving-shaft, the system of gears rotate or swing the shaft and the connecting mechanism in the desired direction, and the anti-friction wheel at the base of the shaft is moved on the incline track, thereby raising the shaft as the same revolves. The raising of the shaft and arms operates the pivoted tilting lever 13. The pivotal point, being raised with the arm, depresses the end which is operated in contact with the stationary cam or track 11, depressing the end of the lever. Its opposite end bearing on the under side of the pivoted incline 9 has the effect to raise the same at its free end into the position shown in Fig. 11, where the pivoted end of the incline is moved into connection with the main line of track, and the car or rolling-stock mounted thereon is free to move by gravity off from the incline onto the main track.

For holding the car or rolling-stock on the incline I provide a system of counterbalanced clutch or lever, 22, Fig. 11, pivoted at 23 to the platform or table, the counterbalanced or weighted end 24 being of sufficient heft to maintain the clutch in the position shown in Fig. 11, the hooked end 25 of the clutch projecting through the table and incline through opening 26, Fig. 1, and extending a sufficient distance above the incline to engage the axle-tree or any other fixed portion of the rolling-stock when the car or rolling-stock is moved onto the incline. This clutch is moved downward by projecting end 27, Fig. 11, engaging the surface of a cam or projection, 28, when the incline is moved into line with the main line or track, whereby the clutch is moved downward, thereby releasing projection 25 from contact with the rolling-stock, which immediately moves onto the main line by gravity, the clutch being moved into its normal position by gravity whenever the same is moved out of contact with the stationary cam, substantially as set forth.

The pivoted incline in its normal position, whenever ready to receive a car, is in substantially a horizontal position. For securing the car or rolling-stock on the incline I provide gravity-latch 29, Fig. 11, pivoted at 30 to the incline, the upper end projecting through aperture 31, Fig. 1, in the incline, the lower end being weighted, whereby the same is maintained in a vertical position, as shown in Fig. 11, and at the same time is movable by the projection engaging the rolling-stock, which moves it forward until the rolling-stock passes the same, when it is carried back into its normal position, the latch being prevented from moving backward by the location of slot 31, which engages its back above its pivotal point. This construction furnishes a ready means of holding the car or rolling-stock while the same is being transferred.

For transferring the car or rolling-stock from the track to my shifting device heretofore explained, I provide a tilting track, 32, Figs. 1, 7, and 8, mounted on frame 33, Fig. 8, suitably supported and pivoted at 34, whereby the same is free to swing up or down, and is raised or lowered by lever 35, Fig. 9, pivoted at 36 to a fixed point, the lever being attached at 37 to connecting-rod 38, which is connected at 39 to toggle-joints 40 40. The lower toggle-joint is pivoted at 41 to a fixed point, and the other toggle-joint is pivoted at 42 to the tilting frame and track. By moving the lever inward from the position shown in Fig. 9 the tilting track and frame are lowered to the level of the main track, as shown in Fig. 8. By moving the lever into the position shown in Fig. 9 the track and frame are tilted into the positions shown in dotted lines in Fig. 8, which brings the track into union with the track on the shifting device heretofore explained.

For bringing the rolling-stock to a stop when the same is moved onto the tilting frame and track, I provide pivoted stop or catch 43, Fig. 8, which is pivoted to the track or frame and is provided with counterbalance-weight 44, whereby the opposite end is maintained in the position shown in dotted lines in Fig. 8, in which position it engages the axle or other fixed points on the rolling-stock. By this mechanism the rolling stock is engaged and held stationary when the track and frame are tilted, as heretofore described, the projecting point of the stop extending through the track and frame in a slot provided, as shown at 45, Fig. 7. This pivoted stop is moved out of contact with the rolling-stock when the pivoted track and frame are sufficiently tilted by the weighted end engaging stationary bracket or other suitable stationary device located under the weighted end at 46, Fig. 8, to contact the pivoted stop at the right instant of time, thereby moving the same out of contact with the rolling-stock, which is moved by gravity and the incline onto the shifting device heretofore explained. The pivoted incline and frame may properly be termed a "tilting dock," provided with suitable tracks on which the rolling-stock may move.

It will be readily seen that in the various devices illustrated in the drawings the shifting device is below the normal level of the track or dock, and this is necessary in order to give the required incline to the dock as a means of transferring the rolling-stock from the track to the shifter, and that this depression, as shown in full lines in Fig. 8, of the shifter must be compensated for and the shifter elevated to form a union with the main line, so that the rolling-stock may be moved from the shifter to the main line of track. This, as I have already explained, is accomplished in Figs. 3 and 4 by the incline track, which moves the shaft vertically. It is quite obvious that the tilting device may be raised and operated by the mechanism shown in Figs. 7 and 10, and for adapting my principle to use in a more compact form than heretofore described, and render the same more serviceable for surface roads, I provide incline track 5, Fig. 10, and incline 47, which accomplishes the same purpose as anti-friction roll in Fig. 4, the two incline surfaces operating upon the principle of a screw, the lower one being stationary and the upper one being movable with the pivotal point of radial arms 7, Fig. 10, whereby the arms are raised by their rotary movement, the opposite ends of the arms being supported on anti-friction roll 48, which travels on a track, 49, the two inclines being constructed to raise a shifting device vertically as the arms are rotated by means of the system of gears in all respects similar to those heretofore described, whereby the shifter is elevated to the level of the main track. In this system of mechanism I operate the pivoted incline 9, Fig. 11, for discharging the rolling-stock onto the main track, by providing screw 50, which fits pivoted screw-threaded nut 51, pivoted in the tilting track heretofore described, the shank of the screw being provided with suitable bushing, 52, in the platform, and the lower end of the screw being provided with spur-gear 53, to which the screw is rigidly attached, the gear engaging internal gear, 54, Figs. 7 and 11, whereby the screw is driven or rotated by the pinion engaging the internal gear as the arms are rotated, whereby the pivoted nut is raised on the screw-threads and the track tilted, as shown in Fig. 11. In this construction the same tilted dock heretofore described is used.

For applying the system of shifting to cars upon an elevated track where the car is suspended below the track, I provide the mechanism shown in Figs. 5 and 6, where the same general mechanical principles are applied, the only difference being the shape of the arms, as shown in Figs. 5 and 6, and the pivoted tilting device 9, Fig. 6, being formed in an arch or bridge, on which are supported tracks 55 55, Figs. 4 and 6, the pivoted lever engaging the under side, substantially as shown in Fig. 4. In this case the cars-wheels are mounted on the top of the coach, which runs beneath the track. In this construction I use the same mechanism for tilting the shifter and bridge as heretofore described, each of which is applicable to this system.

I wish here to observe that the central feature of my invention consists in a swinging system of rising and falling arms, with tilting mechanism for loading and discharging the rolling-stock onto and off from the shifter to the main tracks by the power of gravity, without the use of motive power.

I wish here to observe that I do not intend to limit myself to the mechanism here set forth, but wish to claim, broadly, any mechanism for producing a rising, falling, and swinging shifter, and means for tilting the dock and shifter for loading and discharging rolling-stock, however the same may be operated.

I term the mechanism illustrated in the drawings, provided for shifting the rolling-stock from one track to another, a "shifting device," and the mechanism for tilting the track on the shifting device "tilting mechanism."

What I claim as new, and desire to secure by Letters Patent, is—

1. The combination of the pivoted arms, the table, and tracks mounted thereon, with means for raising the arms when moved in the radius of a circle, substantially as set forth.

2. The combination of the pivoted arms, the table mounted on the extremity of the arms, the pivoted incline, and means for raising the free end of the pivoted incline, substantially as set forth, for the purposes stated.

3. The combination of the shaft and arms with table and tracks mounted on the extremity of the arms for receiving rolling-stock, the incline track for raising the arms when the same are swung, and means for moving the shaft and arms, substantially as set forth, for the purposes stated.

4. The combination of the shaft and arms with table mounted on the arms, the pivoted tracks mounted on the table, the incline tracks for raising the shaft and arms when the same are swung, and means for raising the free end of the pivoted incline, substantially as set forth.

5. The combination of the shaft and arms with table mounted on the arms, the pivoted track mounted on the table, the incline tracks for raising the shaft and arms, the screw, and pivoted nut, operated to raise the pivoted incline, substantially as set forth.

6. The combination, in the shifter, of the pivoted incline track and the pivoted lever or clutch pivoted to the table, projecting above the incline to contact the rolling-stock, the stationary cam for engaging and depressing the clutch for disengaging the same, and the counter-balance for moving the clutch into its normal position, substantially as set forth.

7. The combination of the pivoted gravity-latch, one end of the latch projecting above the track and the opposite end having a counter-balance, with means for preventing the latch from moving backward, substantially as set forth.

8. The combination, with the shifter, of the tilting dock having tracks mounted thereon to be tilted therewith, the same being arranged slightly above the shifter, with means for tilting the dock and track for inclining the latter in the direction of the shifter, substantially as set forth.

9. The combination of the shifter and the pivoted tilting dock, consisting of a frame and tracks mounted thereon, located between the main line of tracks and the shifter, slightly above the latter, with means for tilting the dock by lowering its end into union with the tracks on the shifter, arranged below the level of the main track, substantially as set forth.

10. The combination, with the shifter, of the pivoted tilting dock, consisting of a frame and tracks mounted thereon, located between the main line of tracks and the shifter, slightly above the latter, the toggle-joints pivoted and operated by connecting-rod and lever for tilting the dock, substantially as set forth, for the purposes stated.

11. The combination of the tilting dock, consisting of a frame and tracks mounted thereon, the toggle-joints, pivoted as described, with connecting-rod and lever for operating the same, whereby the dock may be moved, substantially as set forth.

12. In a tilting dock, the combination of the pivoted counterbalance-clutch extending above the surface of the dock, and tracks for contacting the rolling-stock, and a stationary point for engaging the counter-balance and moving the clutch out of contact with the rolling-stock, substantially as set forth.

In witness whereof I have affixed my signature in presence of two witnesses.

CHARLES C. BURTON.

Witnesses:
EDWIN H. RISLEY,
D. McGUCKEN.